(12) United States Patent
Purvis

(10) Patent No.: US 7,107,525 B2
(45) Date of Patent: *Sep. 12, 2006

(54) METHOD FOR CONSTRAINT-BASED DOCUMENT GENERATION

(75) Inventor: Lisa S. Purvis, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/202,183

(22) Filed: Jul. 23, 2002

(65) Prior Publication Data

US 2004/0205472 A1    Oct. 14, 2004

(51) Int. Cl.
G06F 3/00 (2006.01)
G06F 17/00 (2006.01)
G06F 9/00 (2006.01)

(52) U.S. Cl. .............. 715/517; 715/521; 715/523
(58) Field of Classification Search ......... 715/500, 715/517, 521, 522, 523, 524
See application file for complete search history.

(56) References Cited

U.S. PATENT DOCUMENTS

| 5,181,162 A | 1/1993 | Smith et al. |
| 5,224,206 A | 6/1993 | Simoudis |
| 5,228,115 A * | 7/1993 | Natarajan ............. 706/46 |
| 5,278,946 A | 1/1994 | Shimada et al. |
| 5,434,953 A | 7/1995 | Bloomberg |
| 5,438,512 A | 8/1995 | Mantha et al. |
| 5,499,366 A | 3/1996 | Rosenberg et al. |
| 5,517,621 A | 5/1996 | Fukui et al. |
| 5,555,362 A | 9/1996 | Yamashita et al. |
| 5,649,216 A | 7/1997 | Sieber |
| 5,669,006 A * | 9/1997 | Joskowicz et al. ......... 715/517 |
| 5,842,192 A * | 11/1998 | Garcia et al. .............. 706/45 |
| 5,848,430 A | 12/1998 | Takakura et al. |
| 5,911,146 A | 6/1999 | Johari et al. |
| 5,920,879 A * | 7/1999 | Kyojima et al. ............ 715/517 |
| 5,943,670 A | 8/1999 | Prager |
| 5,978,785 A | 11/1999 | Johnson et al. |
| 6,014,678 A | 1/2000 | Inoue et al. |
| 6,021,411 A | 2/2000 | Brophy et al. |
| 6,023,714 A | 2/2000 | Hill et al. |
| 6,044,384 A | 3/2000 | Ishima et al. |
| 6,081,798 A | 6/2000 | Johnson et al. |
| 6,081,816 A * | 6/2000 | Agrawal .................. 715/521 |
| 6,134,563 A | 10/2000 | Clancey et al. |
| 6,173,286 B1 | 1/2001 | Guttman et al. ......... 707/100 |
| 6,212,528 B1 | 4/2001 | Brophy et al. |
| 6,366,918 B1 | 4/2002 | Guttman et al. |

(Continued)

FOREIGN PATENT DOCUMENTS

JP    404116765 A    4/1992

OTHER PUBLICATIONS

Badros, Greg J., et al., "The Cassowary Linear Arithmetic Constraint Solving Algorithm", ACM Transactions on Computer Human Interaction, vol. 8 No. 4, Dec. 2001, pp. 267-306.*

(Continued)

Primary Examiner—Heather R. Herndon
Assistant Examiner—Robert Stevens

(57) ABSTRACT

A system and method specify a custom document as a constraint satisfaction problem to create the specified document using existing constraint solving algorithms wherein the document, its content components, and its layout requirements as elements of a constraint satisfaction problem which when solved, results in an automated document layout for the set of content components. The system and method enables an automated custom document creation process, providing a wider array of output documents.

1 Claim, 3 Drawing Sheets

U.S. PATENT DOCUMENTS

| | | | |
|---|---|---|---|
| 6,405,195 B1 | 6/2002 | Ahlberg | |
| 6,415,430 B1* | 7/2002 | Ashar et al. | 716/18 |
| 6,507,410 B1 | 1/2003 | Robertson et al. | |
| 6,529,934 B1* | 3/2003 | Kawamura et al. | 718/102 |
| 6,556,978 B1* | 4/2003 | Ginsberg et al. | 706/19 |
| 6,571,251 B1 | 5/2003 | Koski et al. | |
| 6,667,750 B1 | 12/2003 | Halstead et al. | |
| 6,668,354 B1 | 12/2003 | Chen et al. | |
| 6,675,355 B1* | 1/2004 | Demopoulos et al. | 715/513 |
| 6,681,380 B1* | 1/2004 | Britton et al. | 717/115 |
| 6,782,376 B1 | 8/2004 | Sato et al. | |
| 6,826,727 B1 | 11/2004 | Mohr et al. | |
| 2001/0051962 A1 | 12/2001 | Plotkin | |
| 2002/0040375 A1 | 4/2002 | Simon et al. | |
| 2002/0103829 A1 | 8/2002 | Manning et al. | |
| 2002/0105537 A1 | 8/2002 | Orbanes et al. | |
| 2002/0111969 A1 | 8/2002 | Halstead, Jr. | |
| 2003/0163785 A1 | 8/2003 | Chao et al. | |
| 2003/0167209 A1* | 9/2003 | Hsieh | 705/26 |
| 2003/0229845 A1 | 12/2003 | Salesin et al. | |
| 2004/0015782 A1 | 1/2004 | Day et al. | |
| 2004/0019847 A1 | 1/2004 | Purvis | |
| 2004/0019850 A1 | 1/2004 | Purvis | |
| 2004/0019851 A1 | 1/2004 | Purvis | |
| 2004/0019852 A1 | 1/2004 | Purvis | |
| 2004/0019855 A1 | 1/2004 | Purvis | |
| 2004/0024613 A1 | 2/2004 | Harrington | |
| 2004/0025109 A1 | 2/2004 | Harrington | |
| 2004/0034613 A1 | 2/2004 | Purvis | |
| 2004/0205493 A1 | 10/2004 | Simpson et al. | |
| 2004/0205588 A1 | 10/2004 | Purvis | |
| 2004/0205609 A1 | 10/2004 | Milton et al. | |

OTHER PUBLICATIONS

Bartak, Roman, "Constraint Programming: In Pursuit of the Holy Grail", Proceedings of the Week of Doctoral Students, WDS99, Part IV, MatFyzPress, Prague, Jun. 1999, pp. 555-564.*

Bartak, Roman, "Constraint Satisfaction", Guide to Constraint Programming, © 1998, pp. 1-3 (downloaded from: http://kti.mff.cuni.cz/~bartak/constraints/constrsat.html).*

Bartak, Roman, "Systematic Search Algorithms", Guide to Constraint Programming, © 1998, pp. 1-3 (downloaded from: http://kti.mff.cuni.cz/~bartak/constraints/backtrack.html).*

Bateman, John, et al., "Toward Constructive Text, Diagram, and Layout Generation for Information Presentation", Association for Computational Linguistics, vol. 27 No. 3, © 2001, pp. 409-449.*

Baykan, Can, "Formulating Spatial Layout as a Disjunctive Constraint Satisfaction Problem", Doctoral Thesis Abstract, Carnegie Mellon Univ., Pittsburgh, PA, Sep. 1991, pp. 1-2 (downloaded from: http://code.arc.cmu.edu/lab/upload/91cbaykan.0.pdf).*

Kumar, Vipin, "Algorithms for Constraint-Satisfaction Problems: A Survey", AI Magazine, Spring 1992, pp. 32-44.*

Zhou, Neng-Fa, "Authoring Graphics-Rich and Interactive Documents in CGLIB—A Constraint-based Graphics Library", DocEng '01, Nov. 9-10, 2001, pp. 28-37.*

Dechter, Rina, et al., "Backjump-based Backtracking for Constraint Satisfaction Problems", Elsevier Science Preprint, Dec. 13, 2001, pp. 1-52 (downloaded from http://www.ics.uci.edu/~csp/R56.pdf).*

Frost, Daniel, et al., "Look-ahead Value Ordering for Constraint Satisfaction Problems", Inter'l Joint Conf. on AI (IJCAI-95), Montreal, Canada, Aug. 1995, pp. 572-578 (downloaded from http://www.ics.uci.edu/~csp/r39-look-ahead-value-ordering.pdf).*

Bes, Frederic, et al., "A Presentation Language for Controlling the Formatting Process in Multimedia Presentations" DocEng '02, Nov. 8-9, 2002, McLean, VA, pp. 2-9 (ACM 1-58113-594-7/02/0011).*

Purvis, Lisa, et al., "Creating Personalized Documents: An Optimization Approach", DocEng '03, Nov. 20-22, 2003, Grenoble, France, pp. 2-9 (ACM 1-58113-724-9/03/0011).*

Bradley, Keith, et al., "Case-Based User Profiling for Content Personalisation", Proc of the Intl Conf on Hypermedia, Brusilovsky et al. (eds.), Adapt. H'media and Adaptive Web-Based Systems, Lect. Notes in CS, vol. 1892, Springer Verlag Publishers, © 2000.*

Borning et al., "Constraints for the Web", ACM Multimedia '97, Seattle, WA, (c) 1997, pp. 173-182 [ACM 0-89791-991-2/97/11].*

Dengler, E. Friedell, M., Marks, J., Constraint-Driven Diagram Layout, Proceedings of the 1993 IEEE Symposium on Visual Languages, pp. 330-335, Bergen, Norway, 1993 (diagrams).

Rousseau, F., Garcia-Macias, A., Valdeni de Lima, J., and Duda, A., *User Adaptable Multimedia Presentations for the WWW*, Electronic Proceedings from the 8th International World Wide Web Conference, 1999 (multimedia presentations).

Graf, W. H., *The Constraint-Based Layout Framework Laylab and Applications*, Electronic Proceedings of the ACM Workshop on Effective Abstractions in Multimedia, 1995 (flowcharts and yellow pages).

Kroener, A., *The Design Composer: Context-Based Automated Layout for the Internet*, Proceedings of the AAAI Fall Symposium Series: Using Layout for the Generation, Understanding, or Retrieval of Documents, 1999.

Badros G., Borning A., *The Cassowary Linear Arithmetic Constraint Solving Algorithm: Interface and Implementation*, University of Washington Technical Report, Jun. 4, 1998, 1998.

Purvis, Lisa, Document Assembly and Transformation: A Survey, XR&T/DITC/CADISYS/DI, Mar. 2001.

Holzner, Steven, Inside XML, New Riders Publishing, Indianapolis, IN, © 2001, pp. 68-73, 77-87, 402-412, 620-621, 626-643, 656-660 and 666-671.

Bradley, Keith, et al., "Case-Based User Profiling for Content Personalisation", Proc's of Int'l Conf on Hypermedia, Brusilovsky et al (eds), Adaptive Hyperm. & Adaptive Web-Based Systems Lecture Notes in CS, vol. 1892, Springer Verlag, © 2000 (11 pages).

Villard, Lionel, et al., "An Incremental XSLT Transformation Processor for XML Document Manipulation", WWW 2002, Honolulu, HI, May 7-11, 2002, pp. 474-485.

Mendes, Emilia, et al. "A Comparison of Case-Based Reasoning Approaches to Web Hypermedia Project Cost Estimation", WWW 2002, Honolulu, HI, May 7-11, 2002, pp. 272-280.

Rus, D.; Customizing Information Capture and Access, Jan. 1997, vol. 15, Issue 1, pp. 67-101, ACM Press.

Iwai, I., et al., "A Document Layout System Uning Automatic Document Architecture Extraction," ACM SIGCH Bulletin, vol. 20, Issue SI, Mar. 1989, pp. 369-374.

Hudson, Scott E., et al, "Ultra-Lightweight Constraints", Proceedings of the 901 Annual ACM Symposium on User Interface U Software and Technology, Nov. 1996, pp. 147-155.

Borning et al., Constraints for the Web, ACM Multimedia '97, Seattle, WA, (c) 1997, pp. 173-182 [ACM 0-89791-991-2/97/11].

Bateman, John, et al., "Toward Constructive Text, Diagram, and Layout Generation for Information Presentation", Association for Computational Unguistics, vol. 27 No. 3, @2001, pp. 409-449.

Baykan, Can. "Formulating Spatial Layout as a Disjunctive Constraint Satisfaction Problem", Doctoral Thesis Abstract. Carnegie Mellon Univ., Pittsburgh, PA, Sep. 1991, pp. 1-2 (downloaded from: http://cocie.arc.cmu.edullablupload/9lcbaykan,0.pdf).

Kumar W; Algorithms for Constraint-Satisfaction Problems: A Survey, AI Magazine, Spring 1992, pp. 32-44.

Zhou, Neng-Fa, Authoring Graphics-Rich and Interactive Documents In CGLIB—A Constraint-based Graphics Library, DocEng '01, Nov. 9-10, 2001, pp. 28-37.

Dechter, Rina, et al., Backjump-based Backtracking for Constraint Satisfaction Problems', Elsevier Science Prepnnt, Dec. 13, 2001, pp. 1-52 (downloaded from http://www.ics.uci.edu/—csp/R56.pdf).

Frost, Daniel, et al., "Look-ahead Value Ordering for Constraint Satisfaction Problems", Inter'l Joint Cant. on AI (IJCAI-95), Montreal, Canada, Aug. 1995, pp. 572-578 (downloaded from httpllwww.ics.uci/edul—cspfr39-look-ahead-value-.

Bes, Frederic, et al., "A Presentation Language for Controlling the Formatting Process in Multimedia presentations", DocEng '02, Nov. 8-9, 2002, McLean, VA, pp. 2-9 (ACM 1-58113-594-7/02/0011).

Purvis, Lisa, et al., Creating Personalized Documents: An Optimization Approach', DocEng 03, Nov. 20-22, 2003, Grenoble, France, pp. 2-9 (ACM 1-58113-724-9/03/0011).

Mariott et al., Fast and Efficient Client-Side Adaptivity for SVG', International World Wide Web Conference Proceedings of the Eleventh International Conference on World Wide Web, pp. 496-507, Honolulu, Hawaii.

Mariott, et al., "Fast and Efficient Client-Side Adaptivity for SVG", International World Wide Web Conference Proceedings of the eleventh international Conference on the World Wide Web, Honolulu, Hawaii, May 7-11, 2002, pp. 496-507.

Ossenbruggen, et al., "Towards Second and Third Generation Web-Based Multimedia", International World Wide Web Conference Proceedings fo the tenth international conference on the World Wide Web, Hong Kong, 2001, pp. 479-488.

W Microsoft Computer Dictionary, 5th Ed., May 1, 2002, Microsoft Press, p. 548.

Badros, et al., "A Constraint Extension to Scalable Vector Graphics", International World Wide Web Conference Proceedings of the tenth international conference on World Wide Web, pp. 489-498, Hong Kong, 2001.

Badros, G. et al.; Constraint Cascading Style Sheets for Web; Technical Report UW CSE 99-05-01; May 7, 1999, Revised Aug. 1999.

Badros, G.; Extending Interactive Graphical Applications; A Dissertation submitted in partial fulfillment of the requiremetns for the degrees of Doctor of Philosophy, University of Washington 2000.

Linton, M. et al.; Composing User Interfaces with Interviews; Mark Linton at Center for Intergrates Systems; Rm 213; Stanford University, CA 94305.

* cited by examiner

METHOD FOR CONSTRAINT-BASED DOCUMENT GENERATION

RELATED APPLICATIONS

Attention is directed to commonly owned and assigned copending Application Numbers:

U.S. Ser. No. 10/202,046, filed Jul. 23, 2002 entitled "CONSTRAINT-OPTIMIZATION SYSTEM AND METHOD FOR DOCUMENT COMPONENT LAYOUT GENERATION".

U.S. Ser. No. 10/202,188, filed Jul. 23, 2002 entitled "CONSTRAINT-OPTIMIZATION SYSTEM AND METHOD FOR DOCUMENT COMPONENT LAYOUT GENERATION".

U.S. Ser. No. 10/202,275, filed Jul. 23, 2002 entitled "SYSTEM AND METHOD FOR CONSTRAINT-BASED DOCUMENT GENERATION".

U.S. Ser. No. 10/202,207, filed Jul. 23, 2002 entitled "SYSTEM AND METHOD FOR DYNAMICALLY GENERATING A STYLE SHEET".

U.S. Ser. No. 10/202,247, filed Jul. 23, 2002 entitled "SYSTEM AND METHOD FOR DYNAMICALLY GENERATING A STYLE SHEET".

U.S. Ser. No. 10/202,227, filed Jul. 23, 2002 entitled "CASE-BASED SYSTEM AND METHOD FOR GENERATING A CUSTOM DOCUMENT".

U.S. Ser. No. 10/202,047, filed Jul. 23, 2002 entitled "CASE-BASED SYSTEM AND METHOD FOR GENERATING A CUSTOM DOCUMENT".

FIELD OF THE INVENTION

The present invention is directed to systems and methods to find document components and assemble them into a custom document such as a variable data document and, in particular, those systems and methods which use constraint-based approaches wherein the document, its content, components, and its requirements are expressed as elements of a constraint satisfaction problem.

BACKGROUND OF THE INVENTION

Custom documents are documents that are personalized or tailored in some way to the particular user of the document. Two growing applications of custom documents are in the domain of variable data printing, as well as in web personalization.

In traditional variable data applications the creation of a custom document is accomplished by an expert in graphic arts, databases, layout, document design, etc. This expert document creator develops an overall layout for the document that includes slots for the variable data. The creator also finds or creates appropriate content pieces, and specifies rules for how to fill in the variable slots with this content, or places the content in a database and then links the slots to particular fields in the database. The variable data application then creates a document for each customer by inserting the data for the customer into its linked slot. These types of templates are typically called "lick and stick", because the template has "art holes" which are defined by the document creator, and then the variable data is placed into those art holes to form different instances of the document. The resulting set of documents is typically quite similar: each variable slot has one piece of content of about the same size and the general layout is the same for all instances, regardless of the available content pieces. Thus, the traditional 'variable data template' not only requires extensive time and expertise from the document creator, but it also does not respond dynamically to varying amounts or types of content pieces, or to restrictions imposed by the variable content.

In the domain of web documents and web personalization, the focus is often not on a dynamic document layout per se but rather on dynamic data. The assumption is that the document template is pre-determined and the challenge is to find the right data at the right time. For instance, dynamic web documents are typically formed by embedding "scripts" (i.e., programs) into the HTML page. These scripts are then interpreted by the web server. This enables certain elements of the document (e.g., a weather reading) to be inserted or created at the time of document display. This approach can only produce documents according to the underlying program. In order to achieve different results, the program must be changed and thus this approach is not truly dynamic. In web personalization applications, much of the focus is on user profiling and understanding what e-commerce customers are doing online so that you can provide the appropriate information. Again, the focus is on finding the appropriate information, not on laying it out differently based on what is found. The techniques used to create dynamic web pages often involve writing specific scripts or programs that can be embedded in web pages and interpreted by the web server. This approach lacks in generality, introduces restrictive platform dependencies, and can be extremely difficult and expensive to maintain.

Traditional creation of custom documents such as variable data documents requires expertise in many areas such as graphic arts and databases and is a time consuming process. With the ever-increasing amount of information in the digital world and the amount of un-trained users producing documents, old publishing tools often prove cumbersome and demanding whereas present dynamic digital environments demand tools that can reproduce both the contents and the layout automatically tailored to personal needs and which can enable novices to easily create such documents.

In the realm of custom document creation, what is needed in the arts is a way to automatically select document content and lay it out into a final document, without relying on expert graphic artists, or using specialized scripts that are embedded in an HTML file.

Known methods for automated creation of documents have focused more on particular types of documents, and not on modeling the problem in a general way in order to address all types of documents. Existing work provides methods for creating diagrams (see Dengler, E. Friedell, M., Marks, J., *Constraint-Driven Diagram Layout*, Proceedings of the 1993 IEEE Symposium on Visual Languages, pages 330–335, Bergen, Norway, 1993), or multimedia presentations (see Rousseau, F., Garcia-Macias, A., Valdeni de Lima, J., and Duda, A., *User Adaptable Multimedia Presentations for the WWW*, Electronic Proceedings from the 8$^{th}$ International World Wide Web Conference, 1999), or flowcharts and yellow pages (see Graf, W. H., *The Constraint-Based Layout Framework LayLab and Applications*, Electronic Proceedings of the ACM Workshop on Effective Abstractions in Multimedia, 1995). Others have explored automating the process of web document layout (see Kroener, A., *The Design Composer: Context-Based Automated Layout for the Internet*, Proceedings of the AAAI Fall Symposium Series: Using Layout for the Generation, Understanding, or Retrieval of Documents, 1999). None of the existing automated approaches provide a formalized, constraint-satisfaction formulation of the document creation process, nor do they include the selection of content in their automated process. Furthermore, existing automated approaches concentrate solely on a single type of document.

What is needed in the arts is a way to eliminate some of the traditional limitations of custom document creation by providing a methodology that supports a flexible and efficient assembly of document components resulting in truly dynamic and personalized documents.

SUMMARY OF THE INVENTION

What is disclosed is a system and method for specifying a custom document as a constraint satisfaction problem (CSP) to create the specified document using existing constraint solving algorithms wherein the document, its content components, and its layout requirements as elements of a constraint satisfaction problem which when solved, results in an automated document layout for the set of content components. This process enables an easier (i.e., automated) custom document creation process, while also providing a wider array of output documents than is possible today.

The document is expressed as a template made up of variables, values, and constraints. An instance of that template is then created, resulting in a set of content and a layout of that content, by using one of a set of well-known constraint satisfaction algorithms. The present invention described herein is the formulation of document creation as a constraint satisfaction problem and the application of existing constraint satisfaction algorithms to automatically create the desired output document, the combination of which is heretofore unknown in the arts. The present method of document composition comprises the steps of; specifying problem variables by identifying zero to n document areas which have associated constraints, and at least 1 document parameter that can be changed; specifying value domains for each variable, by identifying either content pieces appropriate for the associated document area, or by identifying valid ranges for the associated document parameter; specifying layout and/or content constraints which further constrain the valid values of the document parameter and/or document area variables; optionally specifying dynamic constraints that are added/deleted as problem solving occurs; determining a layout for the document such that the values chosen for the document parameters and document areas pass all of the specified constraints according to one of a plurality of existing constraint satisfaction algorithms. Other objects, advantages, and salient features of the invention will become apparent from the detailed description which, taken in conjunction with the drawings, disclose the preferred embodiments of the invention.

DESCRIPTION OF THE DRAWINGS

The preferred embodiment and other aspects of the invention will become apparent from the following detailed description when taken in conjunction with the accompanying drawings which are provided for the purpose of describing the invention and not for the limitation thereof, in which.

DETAILED DESCRIPTION OF THE INVENTION

What is disclosed is a system and method for specifying a custom document as a constraint satisfaction problem (CSP) to create the specified document using existing constraint solving algorithms wherein the document, its content components, and its layout requirements as elements of a constraint satisfaction problem which when solved, results in an automated document layout for the set of content components. This process enables an easier (i.e., automated) custom document creation process, while also providing a wider array of output documents than is possible today.

The document is expressed as a template made up of variables, values, and constraints. An instance of that template is then created, resulting in a set of content and a layout of that content, by using one of a set of well-known constraint satisfaction algorithms e.g., backtracking, forward checking; as taught in Nadel, *Tree Search and Arc Consistency in Constraint Satisfaction Algorithms*, Search in Artificial Intelligence, edited by L. Kanal and V. Kumar, Springer-Verlag, 1988, 287–342. The present invention described herein is the formulation of document creation as a constraint satisfaction problem, and the application of existing constraint satisfaction algorithms to automatically create the desired output document, the combination of which is heretofore unknown in the arts.

In particular, a document template is represented as a constraint satisfaction problem (CSP), and therefore contains a set of variables, a value domain for each variable, and a set of constraints on those variables and values.

Figure 1:
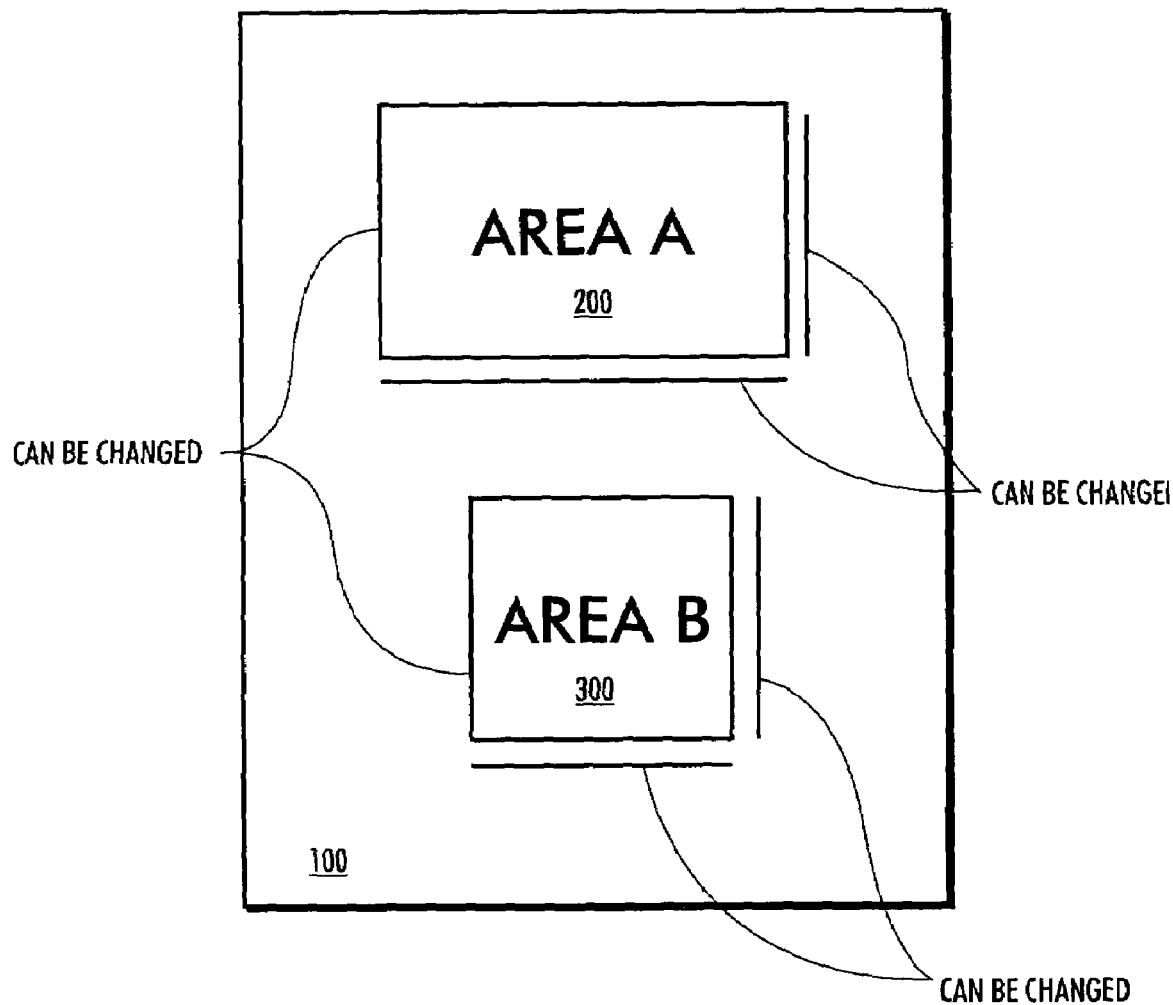
FIG. 1 illustrates a document template which specifies that there are two areas that should be filled with content: areaA and areaB, which also specifies that the positions and sizes of areaA and areaB can be changed.

In this invention, the areas of the document to be filled with content are modeled as problem variables, as are any parameters of the document that can be changed. As an example, consider the document template (100) shown in FIG. 1. The template (100) specifies that there are two areas that should be filled with content: areaA (200) and areaB (300). The template (100) also specifies that the positions and sizes of area (200) and areaB (300) can be changed. Thus, the problem variables for this example are: areaA, areaB, areaA-topLeftX, areaA-topLeftY, areaB-topLeftX, areaB-topLeftY, areaA-width, areaA-height, areaB-width, areaB-height.

Figure 2:
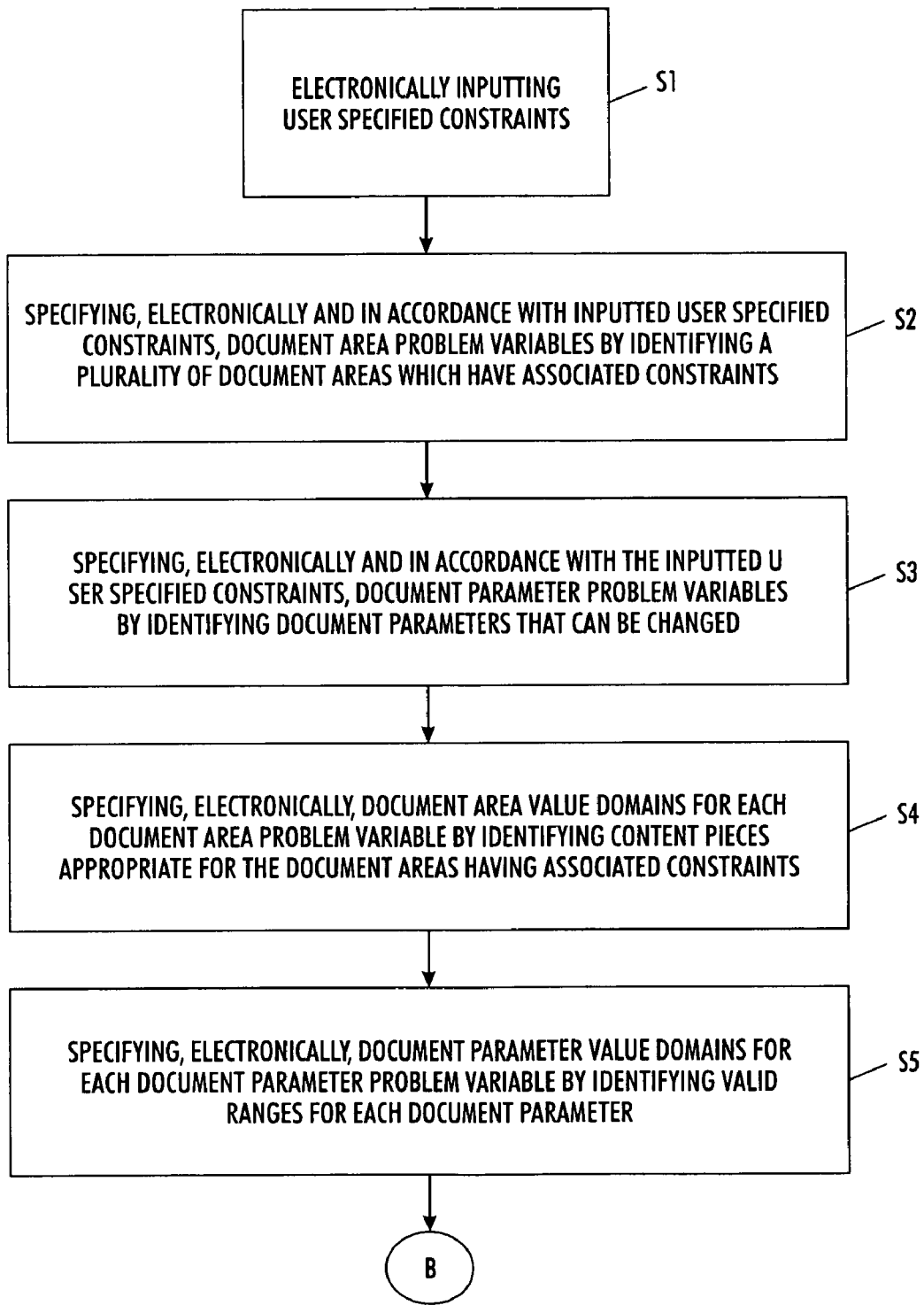
FIG. 2 illustrates a portion of a flowchart showing a method of constraint-based generation of documents.

FIG. 2 illustrates a portion of a flowchart showing a method of constraint-based generation of documents. As illustrated in FIG. 2, the method electronically inputs user specified constraints at step S1. At step S2, the method specifies, electronically and in accordance with inputted user specified constraints, document area problem variables by identifying a plurality of document areas which have associated constraints. At step S3, the method specifies, electronically and in accordance with the inputted user specified constraints, document parameter problem variables by identifying document parameters that can be changed. The method, at step S4, specifies, electronically, document area value domains for each document area problem variable by identifying content pieces appropriate for the document areas having associated constraints. With respect to FIG. 2, at step S5. the method specifies, electronically, document parameter value domains for each document parameter problem variable by identifying valid ranges for each document parameter.

Figure 3:
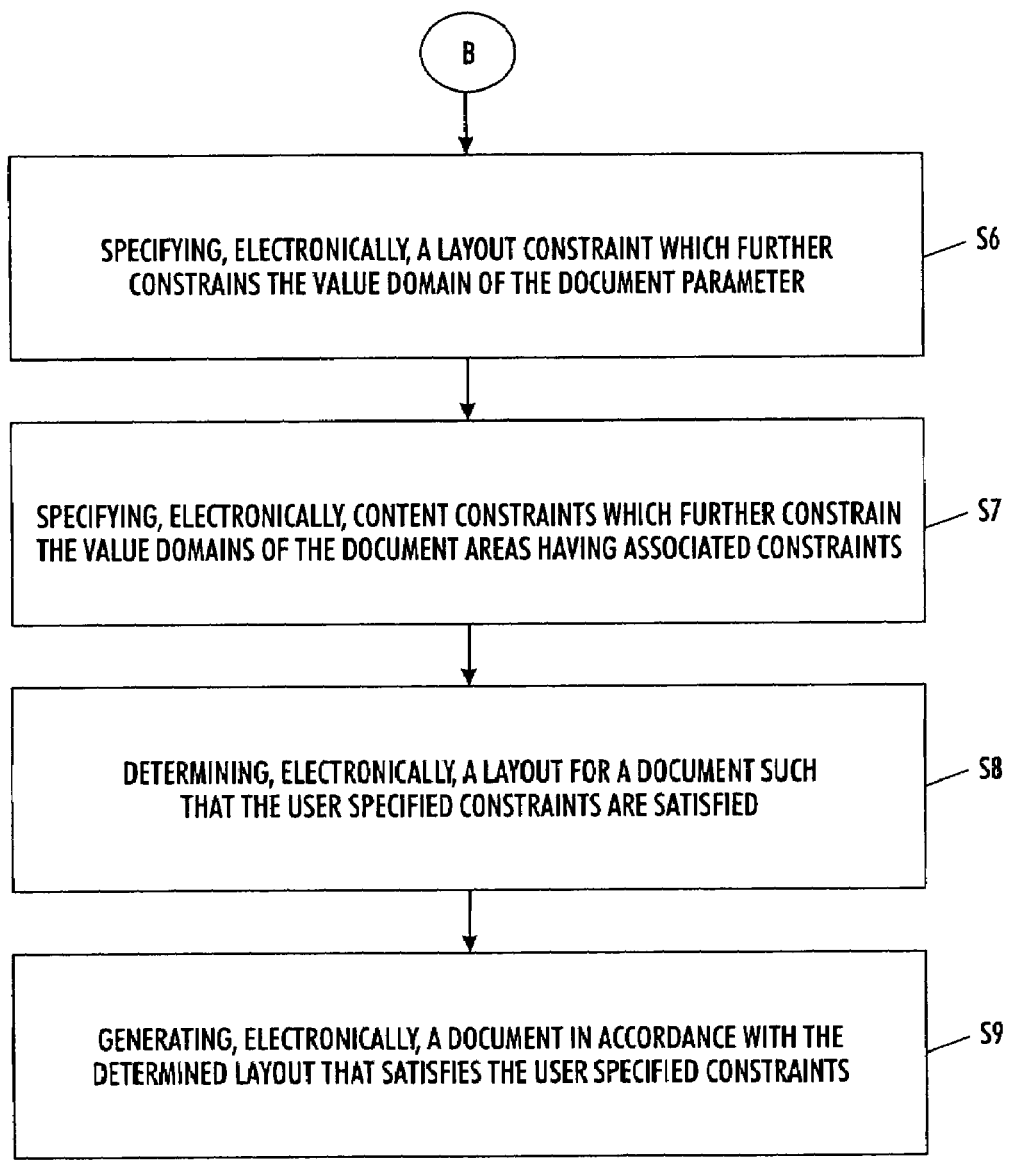
FIG. 3 illustrates a remaining portion of the flowchart showing a method of constraint-based generation of documents.

As noted above, FIG. 3 illustrates a remaining portion of t flowchart showing a method of constraint-based generation of documents. As illustrated in FIG. 3. the method specifies, electronically, at step S6, a layout constraint which further constrains the value domain of the document parameter, At step S7, the method specifies, electronically, content constraints which further constrain the value domains of the document areas having associated constraints and, at step S8 determines, electronically, a layout for a document such that the user specified constraints are satisfied. Lastly, at Step S9, the method generates, electronically, a document in accordance with the determined layout that satisfies the user specified constraints.

The constraint satisfaction problem formulation further specifies that each problem variable has a value domain consisting of the possible values to assign to that variable. This invention teaches that for variables that are document areas to be filled with content (e.g. areaA and areaB of FIG. 1), the value domains are the content pieces that are applicable to each area. For variables that are document parameters, the value domains are discretized ranges for those parameters, so that each potential value for the parameter appears in the value domain. The initial value domain is be set up to be some default range e.g., [1 . . . MAXINT]. For variables whose value domains are content pieces, the default domain is set up to be all possible content pieces in the associated content database, which is specified in the document template.

The constraints specify relationships between variables and/or values that must hold in order for the resulting document to be valid. Constraints may be unary (apply to one variable), binary (apply to two variables/values), and/or n-ary (apply to n values/variables), and in our invention are entered by the user as part of the document template. An example of a unary constraint in the document domain is: areaA must contain an image of a castle. An example of a binary constraint is: areaA-topLeftY+areaA-height<areaB-topLeftY. If we had another variable (areaC), an example of a 3-ary constraint is: areaA-width+areaB-width>areaC-width. In a variable data application of this invention (one of many possible applications), the constraints would also refer to customer attributes e.g., areaA must contain an image that is appropriate for customer1.age.

Any one of the known existing constraint solving algorithms for discrete constraint satisfaction problems is then applied to create the final output document. To follow through our example with one such existing algorithm, we consider a simple backtracking algorithm. Our example problem variables and value domains are:

AreaA {skier1.jpg, skier2.jpg, golf.jpg, snorkel.jpg, snorkel.txt, ski.txt, golf.txt}
AreaB {skier1.jpg, skier2.jpg, golf.jpg, snorkel.jpg, snorkel.txt, ski.txt, golf.txt}
  AreaA-topLeftX {0 . . 500}
  AreaA-topLeftY {0 . . 750}
  AreaB-topLeftX {0 . . 500}
  AreaB-topLeftY {0 . . 500}
  AreaA-width {0 . . 500}
  AreaA-height {1 . . 750}
  AreaB-width {0 . . 500}
  AreaB-height {1 . . 750}

The unary constraints for our example problem are:
  C1: areaA must contain an image of a skier
  C2: areaB must contain text about skiing.

We also have one binary constraint:
  C3: areaA-topLeftY+areaA-height<areaB-topLeftY.

The constraint solver first achieves 'node-consistency', which runs the unary constraints C1 and C2 against each variable's value domain, eliminating any values that don't satisfy the unary constraints. After node consistency, our problem variables and value domains are as follows (note that the value domains for areaA and areaB now have only the content pieces that meet the unary constraints):

areaA {skier1.jpg, skier2.jpg}
  areaB {ski.txt}
  areaA-topLeftX {0 . . 500}
  areaA-topLeftY {0 . . 750}
  areaB-topLeftX {0 . . 500}
  areaB-topLeftY {0 . . 500}
  areaA-width {1 . . 500}
  areaA-height {1 . . 750}
  areaB-width {1 . . 500}
  areaB-height {1 . . 750}

The constraint solver then iteratively tries a value for each variable in succession, checking the binary (and any n-ary) constraints after each assignment, and backtracks to a different value if the assignment violates any constraints. Note that a constraint is considered to be trivially satisfied if any of its component values is not yet instantiated. Thus it isn't until areaA-topLeftY, areaA-height, AND areaB-topLeftY all have values that there is a possibility that C3 is violated.

Thus, a backtracking algorithm would iteratively assign:
  areaA=skier1.jpg
  areaB=ski.txt
  areaA-topLeftX=0
  areaA-topLeftY=0
  areaB-topLeftX=0
  areaB-topLeftY=0
  areaA-width=1
  areaA-height=1 at which point when it checks constraint C3, it will find that areaA-topLeftY (0)+areaA-height (1) is not less than areaB-topLeftY (0), and thus it will backtrack to choose the next possible value for areaA-height. Eventually it will backtrack to a point at which C3 is not violated, and thus will arrive at a valid solution. One can furthermore envision many more constraints that can be added to the problem to ensure a feasible looking output document (e.g., minimum widths for the content areas, etc.). The novelty of the invention is in the modeling of the document template as a constraint satisfaction problem, so that the document creator can specify any set of variables/values/constraints, and then a constraint solving algorithm can automatically create the final output document.

A further extension of the herein taught method for representing a document template as a constraint satisfaction problem and the method for creating the final document by applying a constraint solving algorithm is that the model can be further extended to encompass more complicated documents by using the well-known dynamic constraint satisfaction model and solving algorithms as taught in Mittal and Falkenhainer *Dynamic Constraint Satisfaction Problems*, Proceedings of AAAI 1990, pages 25–32. In dynamic constraint satisfaction, the set of variables, values, and constraints can change as the problem solving progresses. That is, given the current choice of values, other constraints might become active and/or certain variables and/or values might be added or deleted from the problem. In the context of automated document creation, this extension enables document content components to specify their own sets of constraints (e.g., "I'm an image, and my width cannot be less than 350 pixels", or "I'm an image of a cigarette advertisement, and I cannot be placed on the same page as any content from the American Heart Association"). Similarly, dynamic constraints can be added to the problem that specify the use of other problem variables (e.g., "if we choose content for areaA whose width>300 pixels, then we must delete areaC from the problem"). These examples are meant to be illustrative and not comprehensive of all possible dynamic document constraints. In general, any constraint that involves adding/deleting document areas, or that is added/deleted as a consequence of content choices made during constraint solving is what we consider to be a part of the dynamic extension to our document constraint solving model.

We have furthermore implemented and herein describe our particular implementation (one of many possible implementations) of this dynamic document constraint solving model. We have combined the well-known backtracking algorithm with a linear constraint solver as taught in Badros G., Borning A., *The Cassowary Linear Arithmetic Constraint Solving Algorithm: Interface and Implementation*, University of Washington Technical Report, 98-06-04, 1998, to enable dynamic addition/deletion of constraints and problem variables during problem solving.

We model the document area variables (areaA, areaB) as variables for the backtracking algorithm, and further model the layout related variables (areaA-topLeftX, areaA-topLeftY, areaA-width, areaA-height, etc.) as sub-variables to the document area variables. As each top-level variable is instantiated with a value, we add its sub-variables to the linear constraint solver, and we also add any constraints associated with the chosen content value to the linear constraint solver. To continue our example, when we choose value skier1.jpg for areaA, skier1.jpg might have associated constraints that say it cannot be scaled, that its width and height must be its original width and height. Thus, we add the following constraints to the linear constraint solver:

C4: areaA-width=175
C5: areaA-height=255

Now in our particular implementation, we call on the linear constraint solver to determine the validity of the chosen value given these new additional layout constraints. The linear constraint solver processes these new constraints to see if values can be found for all of the other sub-variables (i.e. areaB-topLeftX, areaB-topLeftY, areaB-width, areaB-height) given this and any other already existing layout constraints. If so, then we continue with our backtracking. If not, then we remove constraints C4 and C5 from the linear constraint solver, and backtrack to a different value for areaA. The solver continues in this way, trying candidate content, adding/removing constraints, and checking the active constraints until all document areas are filled with content and the resulting document satisfies all active constraints.

The present invention has many advantages, for instance, the ability to specify what a document should look like but not have to specify exactly how such a layout should be accomplished relieves the document creator from having to evaluate different potential layouts and how each might satisfy or not satisfy certain document requirements. Also, it does not require the document creator to have prior knowledge of the document content at the very beginning of the document creation process thereby enabling the creation of more dynamic output documents.

The present system and method also advantageously provides the ability to automate content selection, which is typically not part of the document layout process, i.e., content pieces are selected that satisfy the rest of the document constraints, thereby allowing automatic decisions to be made about which content to include in the document. This is in contrast to the typical approach of forcing the document creator to select all included content before layout is begun. The present invention also advantageously enables one to define constraints on other aspects of the document such as, for example, the constraint of whatever goes in this area should be Times-Roman font-type of size between 8 and 12 or line spacing constraints between differing types of text. Furthermore, the extension of the representation to a dynamic constraint satisfaction model enables more complicated documents to be represented and automatically created. It advantageously provides the capability to specify constraints on content items themselves such as, for example, the constraint that content should not be scaled more than 50% or that content cannot be on the same page as a certain advertisement.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method of constraint-based generation of documents comprising:
 (a) electronically inputting user specified constraints;
 (b) specifying, electronically and in accordance with inputted were specified constraints, document area problem variables by identifying a plurality of document areas which have associated constraints;
 (c) specifying, electronically and in accordance with the inputted user specified constraints, document parameter problem variables by identifying document parameters that can be changed;
 (d) specifying, electronically, document area value domains for each document area problem variable by identifying content pieces appropriate for the document areas having associated constraints;
 (e) specifying, electronically, document parameter value domains for each document parameter problem variable by identifying valid ranges for each document parameter;
 (f) specifying, electronically, a layout constraint which further constrains the value domain of the document parameter;
 (g) specifying, electronically, content constraints which further constrain the value domains of the document areas having associated constraints;
 (h) determining, electronically, a layout for a document such that the user specified constraints are satisfied; and
 (i) generating, electronically, a document in accordance with the determined layout that satisfies the user specified constraints.

* * * * *